(12) United States Patent
Lee

(10) Patent No.: US 10,966,020 B2
(45) Date of Patent: Mar. 30, 2021

(54) INTELLIGENT SPEAKER FOR RECOVERING VIBRATION ENERGY TO GENERATE ELECTRICAL POWER

(71) Applicant: Wistron Corporation, New Taipei (TW)

(72) Inventor: Yen-Lin Lee, New Taipei (TW)

(73) Assignee: Wistron Corporation, New Taipei (TW)

( * ) Notice: Subject to any disclaimer, the term of this patent is extended or adjusted under 35 U.S.C. 154(b) by 113 days.

(21) Appl. No.: 16/386,265

(22) Filed: Apr. 17, 2019

(65) Prior Publication Data
US 2020/0252718 A1     Aug. 6, 2020

(30) Foreign Application Priority Data
Feb. 1, 2019    (TW) ................... 108104138

(51) Int. Cl.
| H04R 3/00 | (2006.01) |
| H04R 9/02 | (2006.01) |
| H04R 9/06 | (2006.01) |
| H04R 1/02 | (2006.01) |
| H02J 7/00 | (2006.01) |

(52) U.S. Cl.
CPC ............... *H04R 3/00* (2013.01); *H04R 1/025* (2013.01); *H04R 9/025* (2013.01); *H04R 9/06* (2013.01); *H02J 7/00* (2013.01)

(58) Field of Classification Search
CPC .......... H04R 3/00; H02K 35/04; H02J 7/0052
USPC ....................................................... 381/117
See application file for complete search history.

(56) References Cited

U.S. PATENT DOCUMENTS

| 5,889,383 A * | 3/1999 | Teich ............... H02J 7/0047 320/107 |
| 8,836,276 B2 * | 9/2014 | Prescott ............... H02N 2/18 320/107 |
| 2006/0153416 A1 * | 7/2006 | Kaneda ............... H04R 9/02 381/396 |

(Continued)

FOREIGN PATENT DOCUMENTS

| CN | 204013971 | 12/2014 |
| TW | M441722 | 11/2012 |

OTHER PUBLICATIONS

"Office Action of Taiwan Counterpart Application", dated Feb. 11, 2020, p. 1-p. 5.

*Primary Examiner* — Katherine A Faley
(74) *Attorney, Agent, or Firm* — JCIPRNET

(57) ABSTRACT

An intelligent speaker adapted to recover vibration energy to generate electrical power is provided, including a housing, a speaker module, a main board, a power generation module, and a battery module. The speaker module is disposed in the first chamber formed by the housing. The main board disposed in the first chamber transmits an audio signal to the speaker module, wherein the speaker module transmits a main sound wave based on the audio signal. The power generation module is disposed in the first chamber and is vibrated in response to the main sound wave to generate an induction current. The battery module is disposed in the first chamber. The battery module is coupled to the main board to supply the electrical power to the main board, wherein the power generation module is coupled to the battery module and changes the battery module by the induction current.

9 Claims, 4 Drawing Sheets

(56) References Cited

U.S. PATENT DOCUMENTS

| | | | | |
|---|---|---|---|---|
| 2011/0255726 A1* | 10/2011 | Yu | ............................ | H04R 1/025 381/332 |
| 2014/0369518 A1* | 12/2014 | Rothkopf | .................. | H02J 7/00 381/74 |

* cited by examiner

INTELLIGENT SPEAKER FOR RECOVERING VIBRATION ENERGY TO GENERATE ELECTRICAL POWER

CROSS-REFERENCE TO RELATED APPLICATION

This application claims the priority benefit of Taiwan application serial no. 108104138, filed on Feb. 1, 2019. The entirety of the above-mentioned patent application is hereby incorporated by reference herein and made a part of this specification.

BACKGROUND

Technical Field

The disclosure relates to a speaker, and in particular, to an intelligent speaker adapted to recover vibration energy to generate electrical power.

Description of Related Art

With the development of technology, people have come to experience shortages of primary energies. To develop sustainably, people are paying more attention to technologies related to green energy. Green energy may involve technologies such as wind power, solar power, and hydropower. If electronic products can be incorporated with green energy technology, energy shortage may be gradually improved.

Many types of intelligent speakers are currently available on the market, and most of them are designed to provide better acoustic quality. However, these intelligent speakers cannot recover waste energy to achieve energy conservation.

SUMMARY

The disclosure provides an intelligent speaker adapted to recycle vibration energy to generate electrical power.

An intelligent speaker of the disclosure is adapted to recover vibration energy to generate electrical power. The intelligent speaker includes a housing, a speaker module, a main board, a power generation module, and a battery module. The housing forms a first chamber. The speaker module is disposed in the first chamber. The main board is disposed in the first chamber and is coupled to the speaker module. The main board transmits an audio signal to the speaker module, and the speaker module transmits a main sound wave based on the audio signal. The power generation module is disposed in the first chamber and is vibrated in response to the main sound wave to generate an induction current. The battery module is disposed in the first chamber. The battery module is coupled to the main board to supply the electrical power to the main board. The power generation module is coupled to the battery module, and the power generation module charges the battery module by the induction current.

Based on the above, in addition to filtering out the noise in the sound wave, the intelligent speaker of the disclosure can further convert the energy of the noise into electrical power to charge the battery module.

To make the aforementioned more comprehensible, several embodiments accompanied with drawings are described in detail as follows.

DESCRIPTION OF THE EMBODIMENTS

Figure 1:
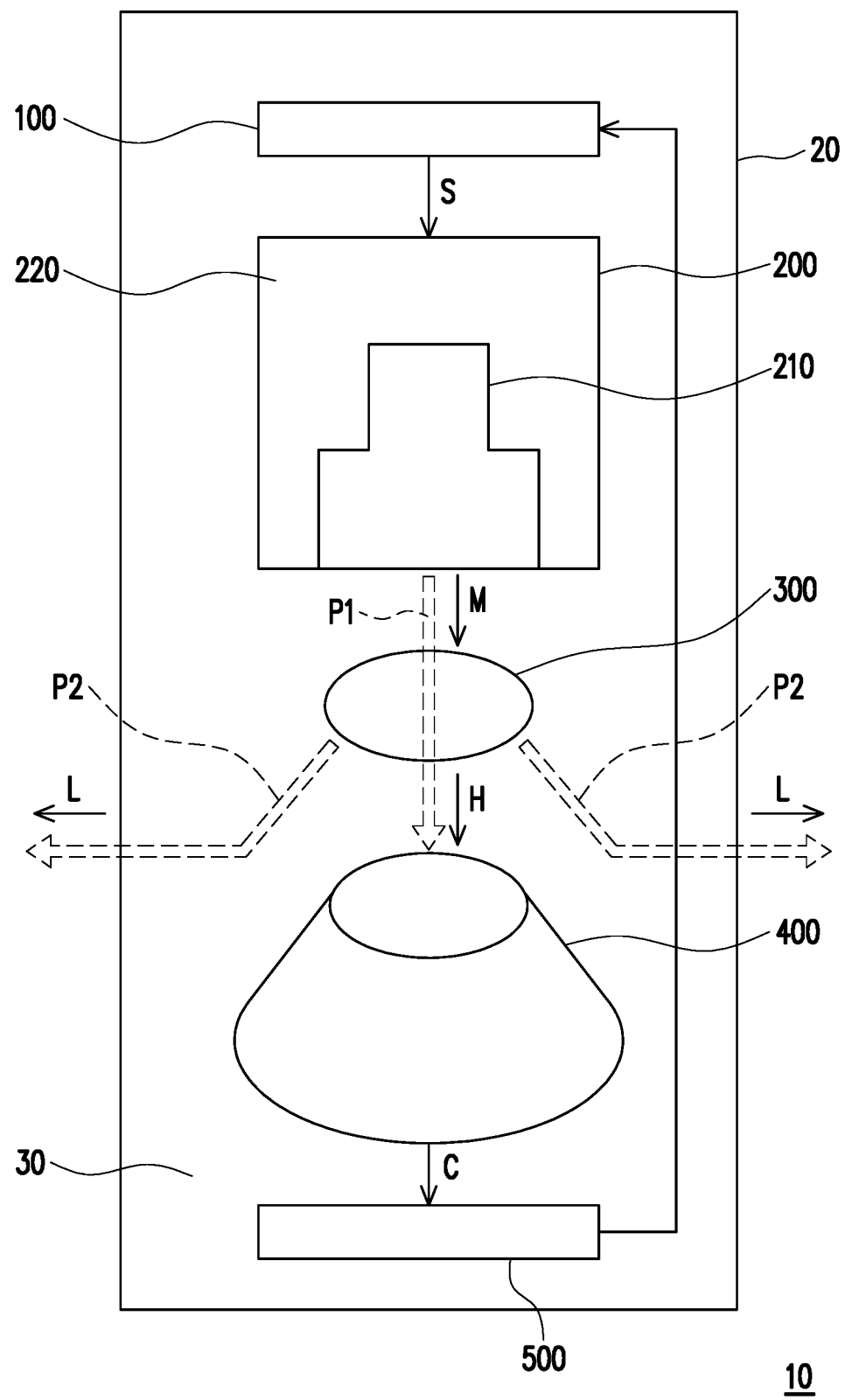
FIG. 1 is a schematic diagram showing an intelligent speaker adapted to recover vibration energy to generate electrical power according to an embodiment of the disclosure.

FIG. 1 is a schematic diagram showing an intelligent speaker 10 adapted to recover vibration energy to generate electrical power according to an embodiment of the disclosure. The intelligent speaker 10 includes a housing 20, a main board 100, a speaker module 200, a first vibration film 300, a power generation module 400, and a battery module 500. The housing 20 forms a first chamber 30 of the intelligent speaker 10. The first chamber 30 can increase the loudness of the sound wave emitted by the speaker module 200 through resonance.

The main board 100 is, for example, a printed circuit board (PCB) or a flexible printed circuit board. The main board 100 is disposed in the first chamber 30 and is coupled to the speaker module 200 and the battery module 500. The battery module 500 is used to supply electrical power to the main board 100. The main board 100 may receive a signal from an external sound source and generate an audio signal S based on the signal. For example, the main board 100 may have an input port, and the external sound source may use an audio line to input the signal to the main board 100 via the input port. In some embodiments, the main board 100 is provided with an antenna. The external sound source may transmit a signal in a wireless manner, and the main board 100 may receive the signal through the antenna. The main board 100 is, for example, a printed circuit board or a flexible printed circuit board, and the disclosure is not limited thereto.

The speaker module 200 is disposed in the first chamber 30. The speaker module 200 receives the audio signal S from the main board 100 and is vibrated based on the audio signal S to transmit a main sound wave M. The speaker module 200 includes a speaker unit 210 and a third chamber 220. The third chamber 220 can increase the loudness of the sound wave emitted by the speaker unit 210 through resonance.

The power generation module 400 is disposed in the first chamber 30 and is oscillated in response to the main sound wave M to generate an induction current C. Specifically, the main sound wave M transmitted by the speaker module 200 may be transmitted to the power generation module 400 along a first sound wave path P1 between the speaker module 200 and the power generation module 400. The power generation module 400 may absorb a portion of the main sound wave M (or absorb a high-frequency sound wave H) and convert the portion of the main sound wave M into electrical power. It is noted that the power generation module 400 may be disposed at any position in the first chamber 30 where the main sound wave M can be received and is not limited to the position shown in FIG. 1.

The first vibration film 300 is disposed on the first sound wave path P1. When sound waves are incident on the first vibration film 300, sound waves of different frequencies will be refracted outward according to different angles of refraction. Specifically, the higher the frequency of the sound wave is, the smaller the angle of refraction is, and the lower the frequency of the sound wave is, the larger the angle of refraction is. Accordingly, the first vibration film 300 can guide the high-frequency sound wave H, which belongs to the noise, in the main sound wave M to be transmitted along the first sound wave path P1, so that the high-frequency sound wave H can be transmitted to the power generation module 400. The power generation module 400 may be vibrated in response to the received high-frequency sound wave H to generate an induction current C. On the other hand, the first vibration film 300 can guide a low-frequency sound wave L, which does not belong to the noise, in the main sound wave M to be transmitted along a second sound wave path P2 which is different from the first sound wave path P1 (the angle of refraction corresponding to the low-frequency sound wave L is larger than the angle of refraction corresponding to the high-frequency sound wave H), so that the low-frequency sound wave L is not transmitted to the power generation module 400. The low-frequency sound wave L is radiated to the outside of the intelligent speaker 10 for the user of the intelligent speaker 10 to listen to.

The battery module 500 is disposed in the first chamber 30. The battery module 500 is coupled to the main board 100 to supply electrical power to the main board 100. On the other hand, the power generation module 400 is coupled to the battery module 500, and the power generation module 400 charges the battery module 500 by the induction current C.

Figure 2:
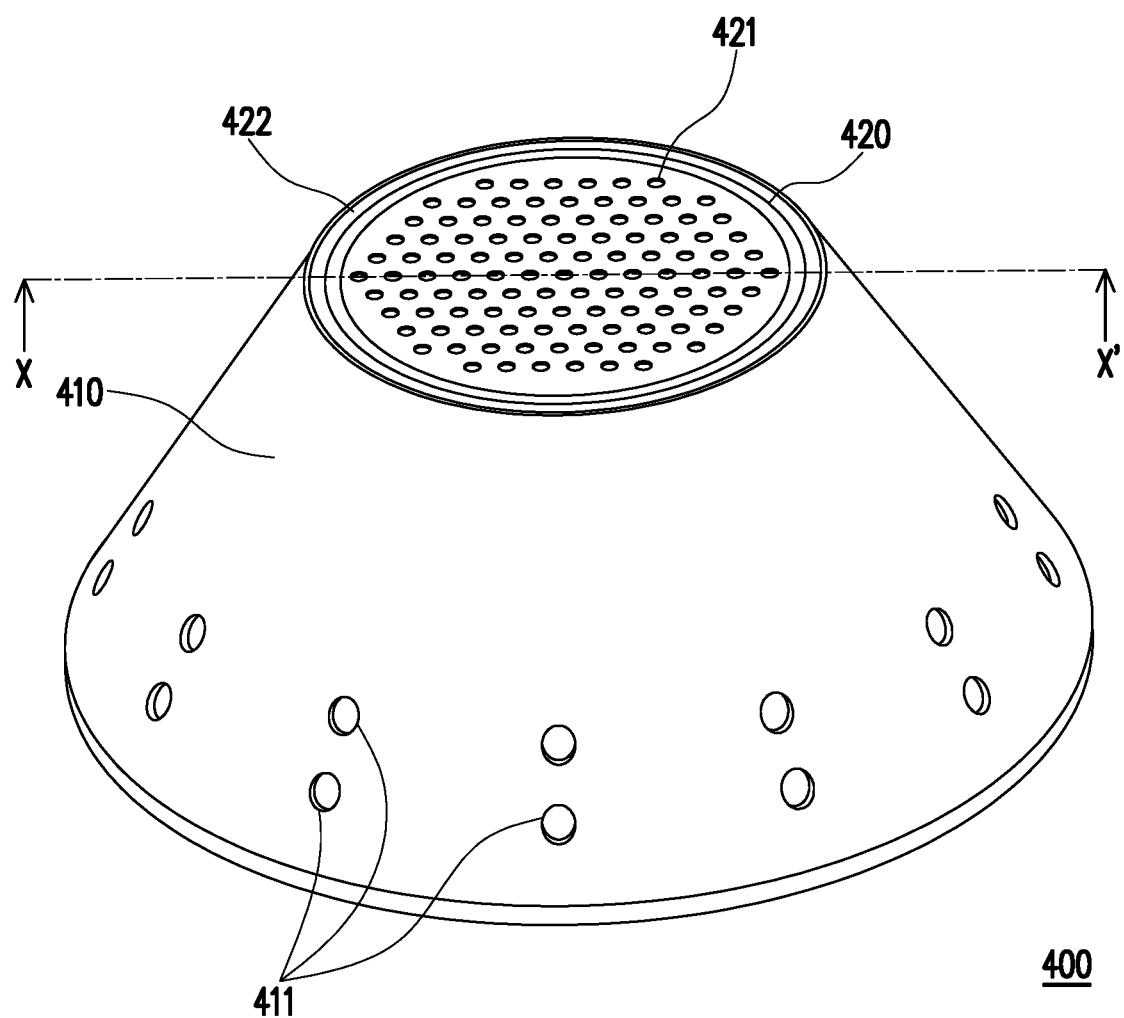
FIG. 2 is a schematic diagram showing a power generation module according to an embodiment of the disclosure.

FIG. 2 is a schematic diagram showing the power generation module 400 according to an embodiment of the disclosure. The shape of the power generation module 400 is, for example, a truncated cone as shown in FIG. 2, and the disclosure is not limited thereto. The power generation module 400 includes a sound guide plate 410 and a second vibration film 420.

The sound guide plate 410 is in a fan surface shape and forms the side surface of the truncated cone. One or more sound holes 411 may be disposed on the surface of the sound guide plate 410. The sound guide plate 410 is used to guide the sound wave to radiate the sound wave in 360 degrees. For example, the portion of the main sound wave M (or the high-frequency sound wave H) that is not absorbed by the power generation module 400 may be transmitted along the sound guide plate 410 and radiated toward the outside of the power generation module 400 via the sound holes 411.

Figure 3A:
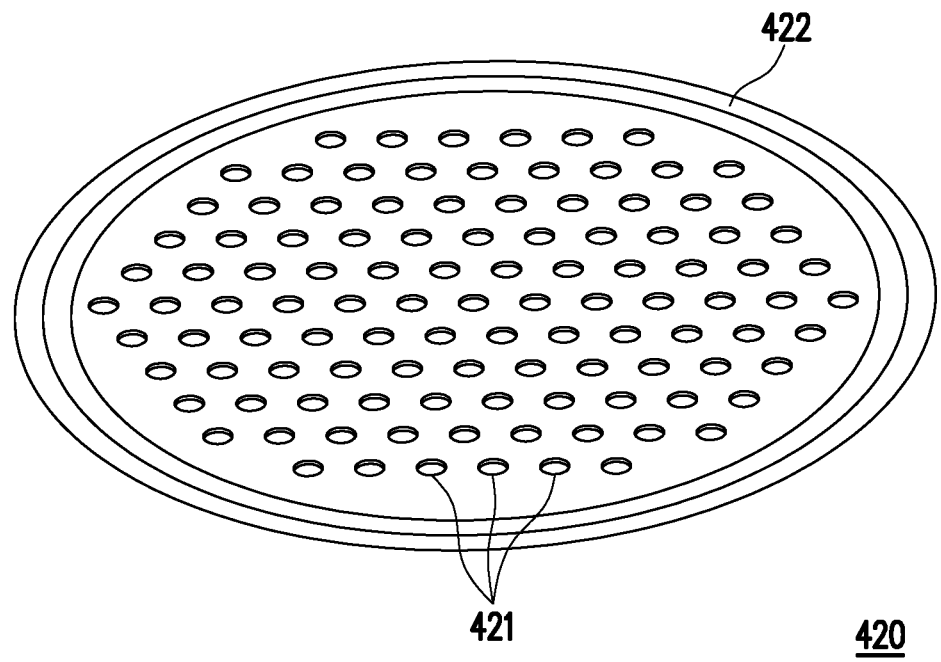
FIG. 3A is a top view showing a second vibration film according to an embodiment of the disclosure.
Figure 3B:
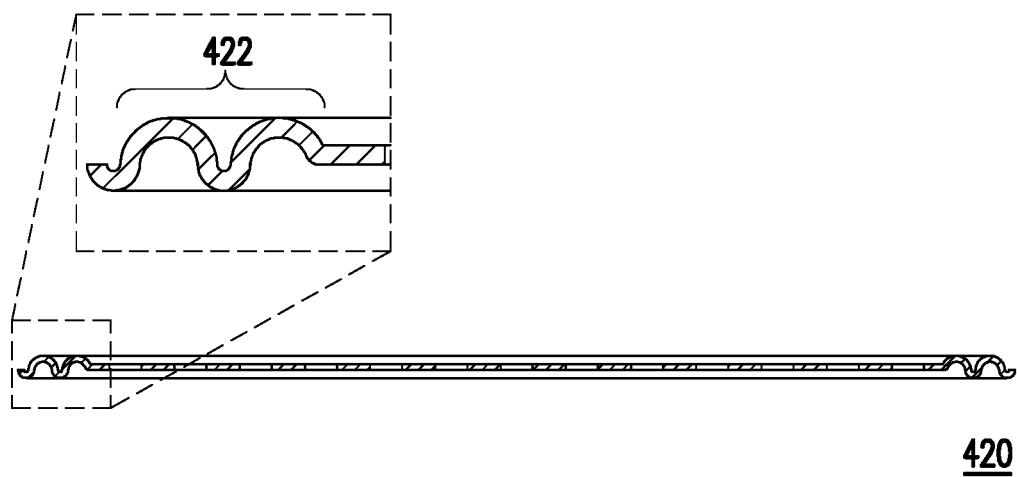
FIG. 3B is a side view showing the second vibration film according to an embodiment of the disclosure.

The second vibration film 420 forms the truncation surface (i.e., the top surface) of the truncated cone. The second vibration film 420 includes one or more air holes 421 and a film framework 422. FIG. 3A is a top view showing the second vibration film 420 according to an embodiment of the disclosure, and FIG. 3B is a side view showing the second vibration film 420 according to an embodiment of the disclosure. Referring to FIG. 3A and FIG. 3B, the one or more air holes 421 are dispersedly disposed on the surface of the second vibration film 420. The film framework 422 supports the periphery of the second vibration film 420 such that the periphery of the second vibration film 420 is in a wave shape.

Figure 4:
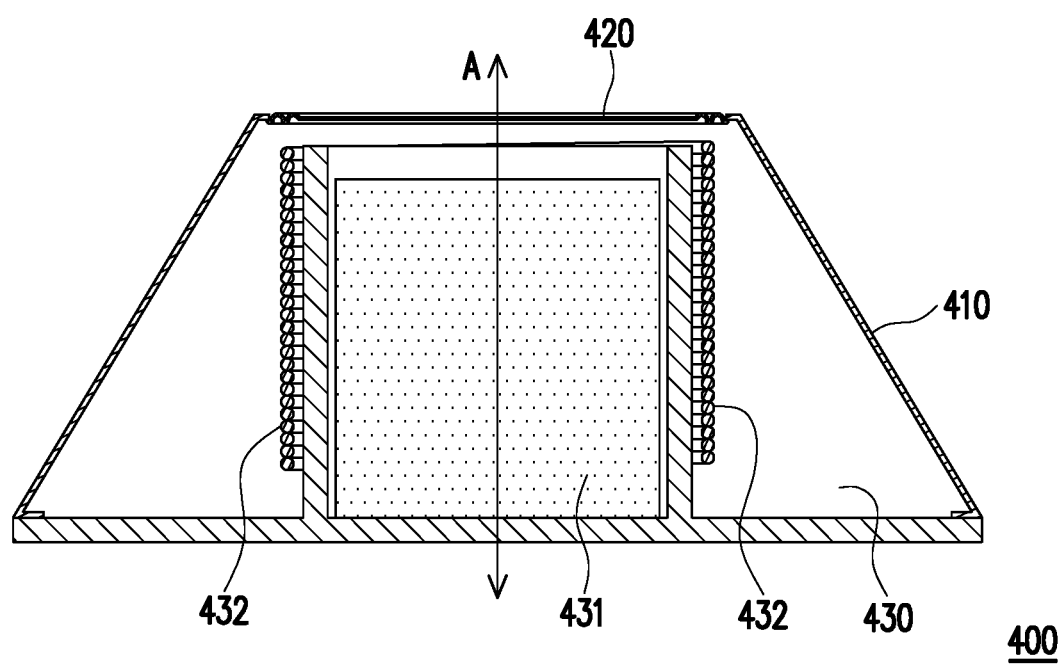
FIG. 4 is a cross-sectional view along line segment X-X' of FIG. 2 according to an embodiment of the disclosure.

FIG. 4 is a cross-sectional view along line segment X-X' of FIG. 2 according to an embodiment of the disclosure. The power generation module 400 further includes a second chamber 430, and a magnet core 431 and an induction coil 432 disposed in the second chamber 430. The second chamber 430 is formed by the sound guide plate 410 and the second vibration film 420. The induction coil 432 is wound around the magnet core 431. When the main sound wave M (or the high-frequency sound wave H) is transmitted to the second vibration film 420, the second vibration film 420 is vibrated in response to the main sound wave M (or the high-frequency sound wave H). Under the influence of the vibration of the second vibration film 420, the induction coil 432 is oscillated in an axial direction A of the magnet core 431 in response to the main sound wave M (or the high-frequency sound wave H). As such, the induction coil 432 can generate the induction current C as shown in FIG. 1 through electromagnetic induction using the magnetic field radiated from the magnet core 431.

In some embodiments, the induction coil 432 may be directly connected to the second vibration film 420 through a connection member and may be oscillated along with the vibration of the second vibration film 420. In some embodiments, it is possible that the induction coil 432 is not connected to the second vibration film 420. When the second vibration film 420 is vibrated, the induction coil 432 is oscillated under the influence of the medium in the second chamber 430.

In summary of the above, the power generation module of the disclosure can recover the sound wave emitted by the speaker module to thereby generate electrical power and achieve energy conservation. Through the first vibration film, the high-frequency sound wave, which belongs to the noise, in the main sound wave is transmitted to the power generation module so that the power generation module can convert the high-frequency sound wave into electrical power. On the other hand, the medium- and low-frequency sound waves, which do not belong to the noise, are guided to the outside of the intelligent speaker. In other words, in addition to filtering out the noise in the main sound wave, the intelligent speaker of the disclosure can further convert the energy of the noise into electrical power to charge the battery module.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An intelligent speaker adapted to recover vibration energy to generate electrical power, the intelligent speaker comprising:
   a housing, forming a first chamber;
   a speaker module, disposed in the first chamber;
   a main board, disposed in the first chamber and coupled to the speaker module, wherein the main board transmits an audio signal to the speaker module, and the speaker module transmits a main sound wave based on the audio signal;
   a power generator, disposed in the first chamber, the power generator being vibrated in response to the main sound wave to generate an induction current, wherein the main sound wave is transmitted to the power generator via a first sound wave path between the speaker module and the power generator;
   a battery module, disposed in the first chamber, the battery module being coupled to the main board to supply the electrical power to the main board, wherein the power generator is coupled to the battery module, and the power generator charges the battery module by the induction current; and a first vibration film, disposed on the first sound wave path, the first vibration film guiding a low-frequency sound wave in the main sound wave to be transmitted along a second sound wave path, so that the low-frequency sound wave is not transmitted to the power generator.

2. The intelligent speaker according to claim 1, wherein the first vibration film guides a high-frequency sound wave in the main sound wave to be transmitted along the first sound wave path, so that the high-frequency sound wave is transmitted to the power generator, and the power generator is vibrated in response to the high-frequency sound wave to generate the induction current.

3. The intelligent speaker according to claim 2, wherein a second angle of refraction corresponding to the second sound wave path is larger than a first angle of refraction corresponding to the first sound wave path.

4. The intelligent speaker according to claim 1, wherein the power generator is a truncated cone and comprises:
   a sound guide plate, wherein the sound guide plate is in a fan surface shape and forms a side surface of the truncated cone; and
   a second vibration film, forming a truncation surface of the truncated cone.

5. The intelligent speaker according to claim 4, wherein the power generator further comprises:
   a second chamber, formed by the sound guide plate and the second vibration film;
   a magnet core, disposed in the second chamber; and
   an induction coil, disposed in the second chamber and wound around the magnetic core, wherein the induction coil is oscillated in an axial direction of the magnet core in response to the main sound wave to generate the induction current through electromagnetic induction.

6. The intelligent speaker according to claim 4, wherein the second vibration film comprises:
   a plurality of air holes, dispersedly disposed on a surface of the second vibration film; and
   a film framework, supporting a periphery of the second vibration film so that the periphery is in a wave shape.

7. The intelligent speaker according to claim 4, wherein a surface of the sound guide plate is provided with a plurality of sound holes.

8. The intelligent speaker according to claim 1, wherein the main board receives a signal from an external sound source of the intelligent speaker and generates an audio signal based on the signal.

9. The intelligent speaker according to claim 1, wherein the main board is one of a printed circuit board and a flexible printed circuit board.

* * * * *